United States Patent
Kawao et al.

(10) Patent No.: US 9,721,598 B2
(45) Date of Patent: Aug. 1, 2017

(54) TERMINAL PAD OF A FLEXURE FOR A HEAD SUSPENSION HAVING A PADDING PLATING AND METHOD OF FORMING THE TERMINAL PAD

(71) Applicant: NHK Spring Co., Ltd., Yokohama-shi, Kanagawa (JP)

(72) Inventors: Sei Kawao, Kanagawa (JP); Yukie Yamada, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 14/695,646

(22) Filed: Apr. 24, 2015

(65) Prior Publication Data

US 2015/0332715 A1 Nov. 19, 2015

(30) Foreign Application Priority Data

May 16, 2014 (JP) .................................. 2014-101986

(51) Int. Cl.
*G11B 5/48* (2006.01)

(52) U.S. Cl.
CPC ............ *G11B 5/483* (2015.09); *G11B 5/4833* (2013.01); *G11B 5/4846* (2013.01); *G11B 5/4853* (2013.01); *G11B 5/4873* (2013.01); *G11B 5/48* (2013.01)

(58) Field of Classification Search
CPC ........ G11B 5/48; G11B 5/4826; G11B 5/4833; G11B 5/4846; G11B 5/4853
USPC .................... 360/234.5, 245.3, 245.4, 245.8
See application file for complete search history.

(56) References Cited

U.S. PATENT DOCUMENTS

| 5,666,717 | A | * | 9/1997 | Matsumoto | .......... | G11B 5/3103 |
| | | | | | | 29/603.12 |
| 6,256,170 | B1 | * | 7/2001 | Honda | .................. | G11B 5/3967 |
| | | | | | | 360/234.5 |
| 6,647,621 | B1 | * | 11/2003 | Roen | ...................... | G11B 5/105 |
| | | | | | | 29/621 |
| 7,239,484 | B2 | | 7/2007 | Yamaguchi | | |
| 7,875,804 | B1 | * | 1/2011 | Tronnes | .................. | G11B 5/484 |
| | | | | | | 174/254 |
| 7,984,545 | B2 | | 7/2011 | Matsumoto et al. | | |
| 8,213,121 | B2 | | 7/2012 | Dela Pena et al. | | |
| 8,295,011 | B2 | | 10/2012 | Chou et al. | | |
| 8,295,012 | B1 | | 10/2012 | Tian et al. | | |
| 8,320,083 | B1 | * | 11/2012 | Dunn | .................... | G11B 5/4846 |
| | | | | | | 360/234.5 |
| 8,395,866 | B1 | * | 3/2013 | Schreiber | ............... | G11B 5/486 |
| | | | | | | 360/245.8 |

(Continued)

FOREIGN PATENT DOCUMENTS

JP 2012-221539 11/2012
JP 2014-041666 3/2014

*Primary Examiner* — Carlos E Garcia
(74) *Attorney, Agent, or Firm* — Norris McLaughlin & Marcus, P.A.

(57) ABSTRACT

A terminal pad of a flexure for a head suspension connected to a functional part through a bonding material includes a terminal body, a base plating formed on a surface of the terminal body and having an uniform thickness, a padding plating made of a same material as the base plating and integrated with the base plating so that the padding plating swells with respect to the base plating, and a surface plating formed on a surface of the padding plating.

11 Claims, 8 Drawing Sheets

(56) References Cited

U.S. PATENT DOCUMENTS

| | | | |
|---|---|---|---|
| 8,760,815 B2* | 6/2014 | Ishii | G11B 5/484 |
| | | | 360/245.8 |
| 2004/0246623 A1* | 12/2004 | Yazawa | G11B 5/33 |
| | | | 360/234.5 |
| 2007/0041123 A1* | 2/2007 | Swanson | G11B 5/484 |
| | | | 360/122 |
| 2014/0368954 A1* | 12/2014 | Inoue | G11B 5/4853 |
| | | | 360/234.5 |

* cited by examiner

FIG.1
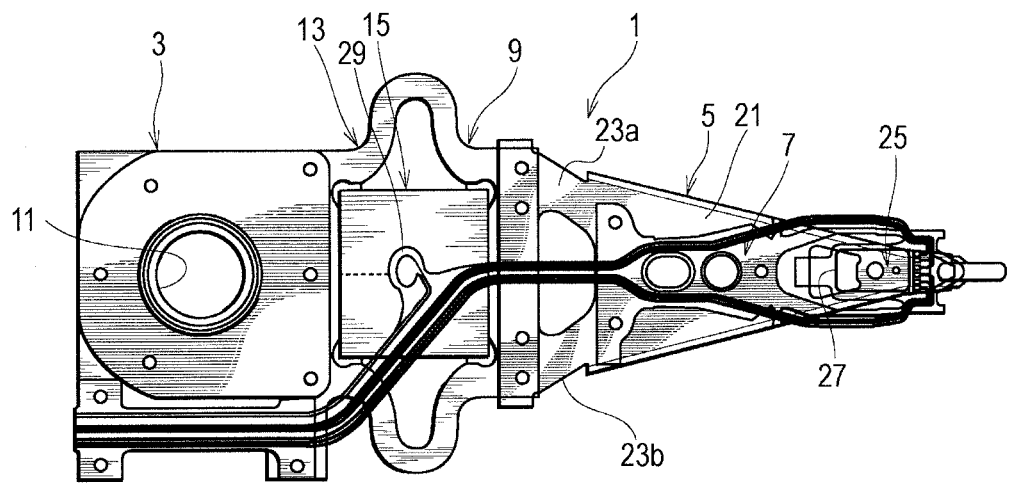
FIG.2A
FIG.2B
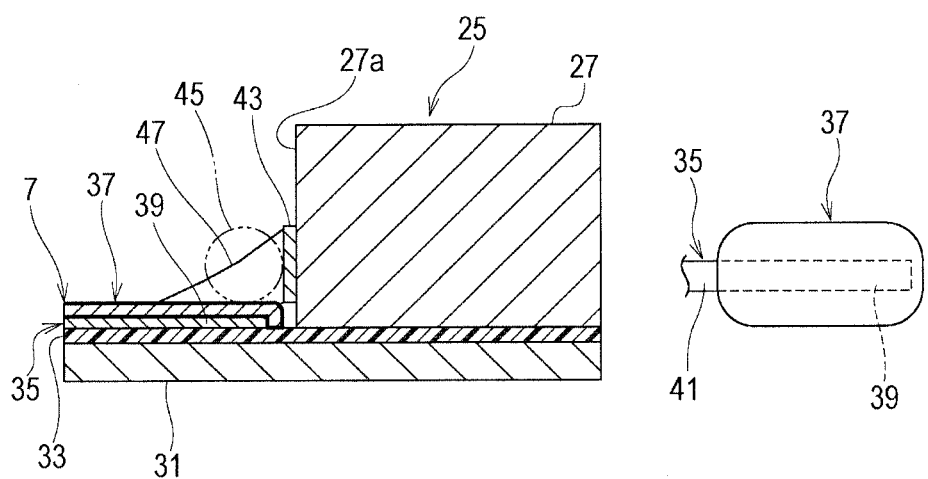

TERMINAL PAD OF A FLEXURE FOR A HEAD SUSPENSION HAVING A PADDING PLATING AND METHOD OF FORMING THE TERMINAL PAD

BACKGROUND OF THE INVENTION

1. Field of the Invention

The present invention relates to a terminal pad of a flexure for a head suspension connected to a functional part such as slider and a method of forming the terminal pad.

2. Description of the Related Art

A hard disk drive (HDD) has a hard disk and a head suspension for supporting a magnetic head (functional part). The magnetic head is connected to the wiring of the head suspension to read and write data from and to the hard disk.

Recently, it is required for a HDD the higher recording density and higher reliability. For this, additional functions may be incorporated into a magnetic head based on components such as a heater for controlling a flying height and a head disk interface (HDI) sensor other than the usual read/write elements. Further additional functions such as energy assisted recording are considered to be incorporated into the magnetic head. Accordingly, there are a lot of magnetic heads with ten or more terminals including the terminals for the functions as well as the ground terminal.

In the current HDD, a minute slider so-called "Femto slider" having the width of mere 0.7 mm is used for a magnetic head. To connect the magnetic head to wiring of a head suspension, the ten or more terminals arranged within the width of 0.7 mm of the slider have to be joined to the respective terminals of the wiring of the head suspension without short circuit.

Such a connection between terminals of a slider and a head suspension is often carried out by reflow soldering with the use of micro solder balls as disclosed in U.S. Pat. No. 7,239,484B2, U.S. Pat. No. 7,984,545B2, U.S. Pat. No. 8,213,121B2, U.S. Pat. No. 8,295,011B2, and U.S. Pat. No. 8,295,012B1. In particular, the terminals of the slider are placed close to and orthogonal to the terminals of the head suspension. Then, the micro solder ball is put in each one depression between the orthogonal terminals and is reflowed to join the orthogonal terminals together (FIGS. 4(a) and 4(b) of U.S. Pat. No. 7,984,545B2, for instance).

The terminals of the slider are formed on the side surface of the slider at positions slightly displaced inside (toward the upper side) relative to the lower surface of the slider. Accordingly, the terminals of the slider keep a slight distance from the terminals of the head suspension. The distance has an insignificant effect on the connection between the terminals of the slider and the head suspension if the terminals are relatively large. This is because the solder ball is relatively large and is reflowed to form a clear fillet shape spanning between the terminals.

Currently, the terminals are arranged in high density as mentioned above to become relatively small, and the solder ball also becomes relatively small by necessity.

Accordingly, the solder does not form the clear fillet spanning between the terminals of the head suspension and the slider and having the sufficient thickness. This increases risk for connection failure and is desired to be promptly solved.

Such a connection between terminals using a solder ball is also applicable at a tail portion of a flexure of the head suspension for a connection between the head suspension and the main flexible circuit board as a functional part. For this connection, the similar problem is caused.

Further, such a problem is caused by solder jetting as well as the reflow soldering of the solder balls. The solder jetting is carried out by reflowing solder paste previously sprayed to the terminals to connect the terminals or spraying melted solder to the terminals to immediately connect the terminals. If the used amount of the solder decreases with the downsizing of the terminals, a problem similar to that of the small solder balls is caused.

Moreover, a recent head suspension may have piezoelectric elements as functional parts that are connected to a flexure in order to minutely position a magnetic head. In this case, conductive paste is used for a connection between terminals of the flexure and the piezoelectric elements. If the used amount of the conductive paste decreases with, for example, the downsizing of the head suspension, a connection failure is caused similar to the above.

SUMMARY OF THE INVENTION

An object of the present invention is to provide a terminal pad of a flexure for a head suspension connected to a functional part and a method of forming the terminal pad, capable of preventing a connection failure even if the used amount of a bonding material decreases to connect the terminal pad and the functional part.

In order to accomplish the object, a first aspect of the present invention provides a terminal pad of a flexure for a head suspension connected to a functional part. The terminal pad includes a terminal body, a base plating formed on a surface of the terminal body and having an uniform thickness, a padding plating made of a same material as the base plating and integrated with the base plating so that the padding plating swells with respect to the base plating, and a surface plating formed on a surface of the padding plating.

A second aspect of the present invention provides a method of forming the terminal pad. The method forms the padding plating by a plating process without a mask according to controlled processing time or by a plating process with a partial mask for the terminal pad.

According to the first aspect, the padding plating shortens a distance between the connected portions of the terminal pad and the functional part, thereby to prevent a connection failure even if the terminal pad and the functional part are connected to each other with the less used amount of the bonding material.

Further, the padding plating is easily formed because it is made of the same material as the base plating and is integrated with the base plating.

According to the second aspect, the method securely forms the padding plating that is required for the terminal pad to be completed.

BRIEF DESCRIPTION OF THE DRAWINGS

FIG. 1 is a plan view illustrating a head suspension viewed from a flexure side according to a first embodiment of the present invention;

FIG. 2A is a sectional view schematically illustrating a connection between terminals at a head portion of the flexure of FIG. 1;

FIG. 2B is a plan view schematically illustrating the terminal of the flexure of FIG. 2A;

FIGS. 5A to 5C are sectional views in which FIG. 5A illustrates the terminal on the head portion of the flexure according to the first embodiment, FIG. 5B illustrates a terminal without a padding plating according to a comparative example, and FIG. 5C illustrates a terminal without a padding plating according to another comparative example;

DETAILED DESCRIPTION OF EMBODIMENTS

Figure 3:
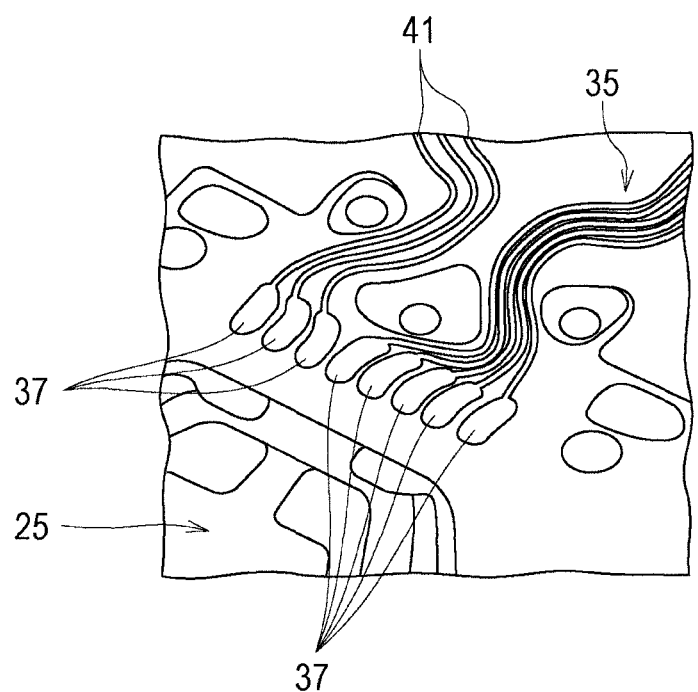
FIG. 3 is a perspective view illustrating terminals on the head portion of the flexure of FIG. 1.

Embodiments according to the present invention will be explained. Each embodiment is capable of preventing a connection failure even if the used amount of a bonding material decreases to connect a terminal pad and a functional part. For this, the terminal pad of each embodiment includes a terminal body, a base plating formed on a surface of the terminal body and having an uniform thickness, a padding plating made of the same material as the base plating and integrated with the base plating so that the padding plating swells with respect to the base plating, and a surface plating formed on a surface of the padding plating.

In the preferred embodiment, the terminal pad of the flexure is formed on an insulating layer provided on the flexure and the padding plating swells from the base plating and the insulating layer around the base plating.

The bonding material is what turns a liquid to a solid to connect the terminal pad and the functional part. For example, solder or conductive paste may be used as the bonding material.

The terminal pad is applicable to a connection with respect to a slider or a main flexible circuit board as the functional part on a head portion or a tail portion of the flexure.

The terminal pad is also applicable to a connection with respect to a piezoelectric element as the functional part on an intermediate portion between the head portion and the tail portion of the flexure.

In the terminal pad on the head portion or the tail portion of the flexure, it is preferred that the terminal body is located on an insulating layer of the flexure, the base plating is a substrate plating that coats the surface of the terminal body in the form of a film, and the padding plating encloses the surface of the terminal body through the substrate plating in cross section.

In the terminal pad on the intermediate portion of the flexure, it is preferred that the terminal body is arranged opposite through an insulating layer of the flexure to the piezoelectric element and faces a through-hole formed through the insulating layer at an intermediate portion between the head portion and the tail portion of the flexure, the base plating is a via plating formed on a surface of the terminal body and, in whole or in part, located in the through-hole, and the padding plating swells from the via plating toward the piezoelectric element in cross section.

In the preferred embodiment, the padding plating has a thickness being greater than a thickness of the terminal body and/or has an arch-shaped surface in cross section. The thickness and the surface shape of the padding plate, however, may vary.

In the preferred embodiment, the base plating and the padding plating are a nickel plating. The material of the base plating and the padding plating, however, are not limited to the nickel.

In an embodiment, the padding plating is formed by a plating process without a mask according to controlled processing time or by a plating process with a partial mask for the terminal pad.

Hereinafter, the embodiments of the present invention will be explained in detail with reference to drawings.

FIG. 1 is a plan view illustrating a head suspension viewed from a flexure side according to the first embodiment of the present invention. In the following explanation, a direction along a turning radius of the head suspension is referred to as a longitudinal direction or a front and rear direction, a turning direction of the head suspension orthogonal to the longitudinal direction is referred to as a width direction or sway direction, and a direction along a turning axis is referred to as a thickness direction.

As illustrated in FIG. 1, the head suspension 1 includes a base plate 3, a load beam 5, a flexure 7, and a positioning actuator 9.

The base plate 3 is a component attached to a carriage (not illustrated) and is driven by the carriage to turn around a spindle. The base plate 3 is provided with a boss 11 that allows the base plate 3 to be attached to the carriage by ball caulking. To the base plate 3, the positioning actuator 9 is integrally attached.

The positioning actuator 9 displaces a head 25 (explained later) with respect to the base plate 3 in the sway direction. The positioning actuator 9 includes an actuator plate or base 13 and a piezoelectric element 15 attached to the actuator plate 13. The rear part of the actuator plate 13 is laid on the base plate 3 and is integrally connected thereto by laser spot welding or the like. To the front part of the actuator base 13, the load beam 5 is integrally connected by laser spot welding or the like.

The load beam 5 integrally includes a rigid part 21 and spring parts or resilient parts 23a and 23b. The resilient parts 23a and 23b are connected to the front part of the actuator base 13. The base end of the rigid part 21 is supported with the front part of the actuator base 13 through the resilient parts 23a and 23b. With this configuration, the load beam 5 applies load onto the read/write head 25 on the tip end (front end or head portion) of the head suspension 1. To the rigid part 21, the flexure 7 is attached.

The flexure 7 has a front end or head portion to which a slider 27 is attached. The slider 27 configures a magnetic head or the head 25 having functions based on components of read/write elements, a heater for controlling a flying height, a head disk interface (HDI) sensor and the like that are incorporated into the slider 27 (FIG. 2). The slider 27 includes terminals 43 for the read/write elements, a heater for controlling a flying height, a head disk interface (HDI) sensor and the like. Corresponding to the terminals 43, terminals 37 serving as the respective terminal pads are provided to wiring of the flexure 7. The terminals 37 are connected to the respective terminals 43 by soldering.

The flexure 7 extends from the head portion or front end to the tail portion or rear end and passes over the positioning actuator 9 at the intermediate portion between the head portion and the tail portion.

Figure 9:
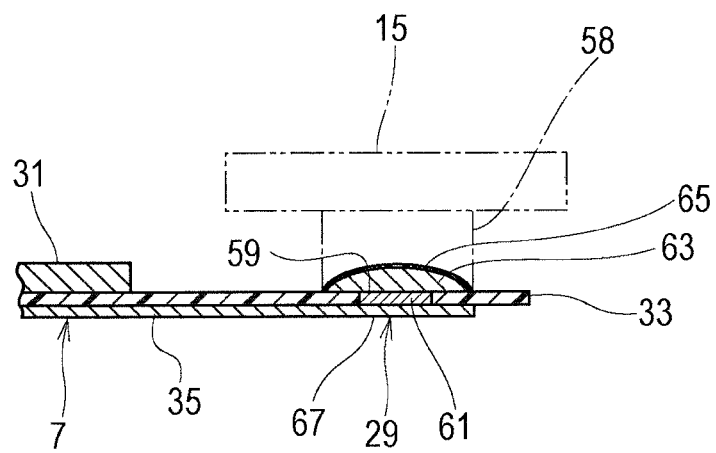
FIG. 9 is a sectional view schematically illustrating a connection between a terminal of a flexure and a piezoelectric element of a positioning actuator according to a second embodiment of the present invention.

On the intermediate portion, the flexure 7 has a terminal 29 that is electrically connected to an electrode of the piezoelectric element 15 through conductive paste (FIG. 9).

The head suspension 1 is attached to the carriage with the boss 11, to be incorporated into a hard disk drive (HDD).

The head suspension 1 in the HDD is turned by a voice coil motor of the carriage, to move the head 25 with the slider 27 on the hard disk. Then, the head 25 is positioned on a given track of the hard disk with the movement, to read or write information from and to the hard disk therethrough.

When the head 25 is positioned on the given track, the positioning actuator 9 minutely drives the head 25 in the sway direction to improve the positioning accuracy.

Figure 4:
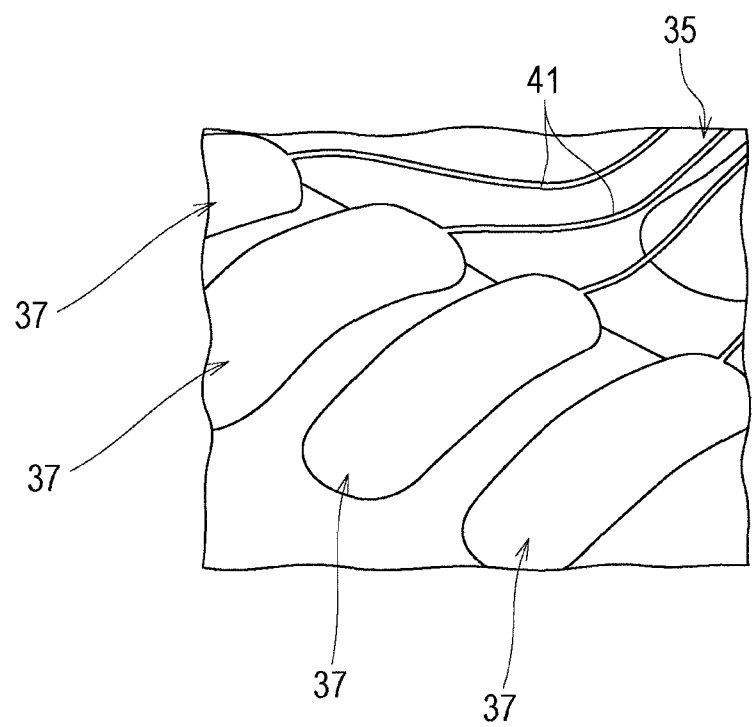
FIG. 4 is an enlarged perspective view illustrating a part of FIG. 3.

FIG. 2A is a sectional view schematically illustrating the connection between the terminals 37 and 43 at the head portion of the flexure 7. FIG. 2B is a plan view schematically illustrating the terminal 37 of the flexure 7 of FIG. 2A. FIG. 3 is a perspective view illustrating the terminals 37 formed on the head portion of the flexure 7. FIG. 4 is an enlarged perspective view illustrating a part of FIG. 3.

As illustrated in FIGS. 1 and 2A, the flexure 7 has a cross-section structure that includes a resilient thin conductive plate 31 such as a stainless steel rolled thin plate (SST), an electric insulating layer 33 formed or laminated on the conductive thin plate 31, and a wiring pattern 35 made of conductive material such as copper and formed or laminated on the electric insulating layer 33. The wiring pattern 35 excepting the terminals 37 (explained later) is covered with a cover insulating layer (not illustrated). The conductive thin plate 31 has the thickness of about 10 to 25 µm. The wiring pattern 35 has the thickness of about 5-15 µm. Such numerals may be appropriately change according to a design.

As illustrated in FIGS. 3 and 4, the wiring pattern 35 has a plurality of wiring traces 41 to which the plurality of terminals 37 are formed, respectively. According to the embodiment, eight terminals 37 are formed to the respective eight traces 41. Ten or more terminals 37 may be formed according to the number of the terminal 43 of the head 25. Each terminal 37, as illustrated in FIG. 2, is formed to expand in comparison with the corresponding wiring trace 41 of the wiring patter 35. The details will be explained later.

As illustrated in FIG. 2A, the slider 27 that is the functional part of the head 25 is, for example, a Femto slider and has, for example, the eight terminals 43 that correspond to the read/write elements, the heater for controlling the flying height, the HDI sensor and the like according to the incorporated functions. The terminals 43 are arranged on the side face 27a of the slider 27 side by side in the width direction. The number of the terminals 43, however, may be changed according to the incorporated functions and may be ten or more for example.

The head 25 is attached onto the surface of the flexure 7 so that the side face 27a of the slider 27 is located approximately orthogonal to the surface of the flexure 7. According to this configuration, the terminals 43 are adjacent and approximately orthogonal to the respective terminals 37 located on the surface of the flexure 7 in cross section. The adjacent terminals 43 and 37 are paired, respectively.

The paired adjacent terminals 37 and 43 are connected by soldering and a fillet 47 that is the solidified solder is formed between the paired terminals 37 and 43. According to the embodiment, the fillet 47 is formed by solder ball connection i.e. reflowing a solder ball 45 set into a depression defined between the paired terminals 37 and 43. The fillet 47, however, may be formed by solder jetting connection. The solder jetting connection reflows solder paste previously sprayed to the terminals 37 and/or 43. Alternatively, the solder jetting connection sprays melted solder between the paired terminals 37 and 43. The fillet 47 spans from the surface of the terminal 43 to the surface of the terminal 37 with the substantially uniform sectional shape. The sectional shape of the fillet 47 on the terminal 43 extends from the upper end to the lower end of the terminal 43 and has the sufficient width secured in the range not to cause a connection failure.

Figure 5A:
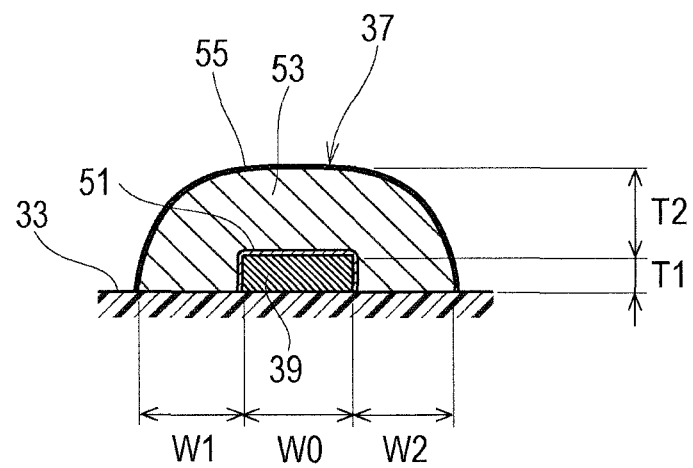
Figure 5B:
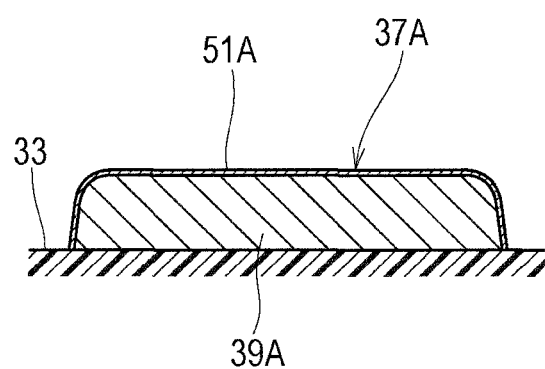
Figure 5C:
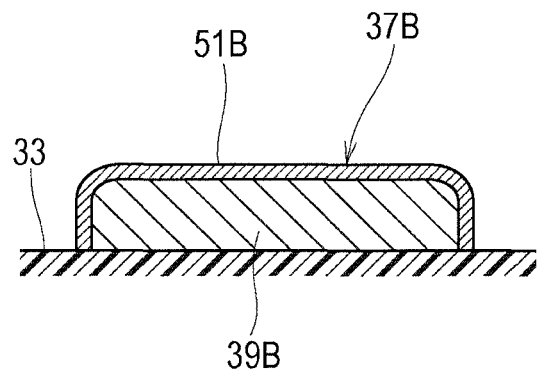

FIGS. 5A to 5C are sectional views in which FIG. 5A illustrates the terminal 37 formed on the head portion of the flexure 7 according to the first embodiment, FIG. 5B illustrates a terminal without a padding plating according to a comparative example, and FIG. 5C illustrates a terminal without a padding plating according to another comparative example.

As illustrated in FIGS. 2A to 5A, each one terminal 37 as a whole is formed into a semi-cylindrical shape so that the sectional shape of the terminal 37 is a D-shape or a semi-circular shape. The terminal 37 includes a terminal body 39, a substrate plating 51 serving as a base plating, a padding plating 53, and a surface plating 55.

The terminal body 39 is a plate that is an extension of the wiring trace 41 of the wiring pattern 35 and extends from the wiring trace 41 without change in width and thickness to have the same width and thickness as the wiring trace 41. According to the embodiment, the width W0 of the wiring trace 41 and the terminal body 39 is set to about 25 µm.

The substrate plating 51 is a nickel plating and is formed on the surface of the terminal body 39 with the uniform thickness to entirely coat the top face and the side faces of the terminal body 39.

The padding plating 53 is made of nickel that is the same material as the substrate plating 51 and integrated with the substrate plating 51. The padding plating 53 swells with respect to the substrate plating 51 and a part of the insulating layer 33 surrounding the substrate plating 51. The surrounding part of the insulating layer 33 is in the planar view. The padding plating 53 raises the level of the surface of the terminal 37 and expands the terminal 37 relative to the wiring trace 41 in the planar view.

The padding plating 53 is formed together with the substrate plating 51 by a plating process without a mask to swell with respect to the terminal body 39 and the surrounding area thereof according to controlled processing time. In addition, a mask may be used for parts without relation to the terminal 37.

In particular, the formation process of the padding plating 53 extends for the terminals 37 the processing time of the normal substrate plating process that is also carried out to the other terminals without the padding plating 53. The extension of the processing time is carried out before or after forming the normal substrate plating. With this method, the substrate plating 51 and the padding plating 53 are integrally formed on the surface of the terminal body 39 of the terminal 37 together with the normal substrate plating of the other terminals.

Accordingly, the substrate plating 51 and the padding plating 53 are continuous and integrated with each other and have no boundary between them though the substrate plating 51 is conceptually distinguished from the padding plating 53 in FIG. 5A.

The substrate plating 51 means a partial region of the integrated substrate plating 51 and padding plating 53 that coats the surface of the terminal body 39 with the uniform thickness and corresponds to the normal substrate plating (FIGS. 5B and 5C) of the other terminals without the padding plating 53.

Namely, the padding plating 53 and the substrate plating 51 are grasped as illustrated in FIG. 5A regardless of timing of the extension of the processing time of the normal substrate plating process before or after the formation of the normal substrate plating.

The substrate plating 51 and the padding plating 53 do not have to be formed together with the substrate plating of the other terminals. The thickness of the substrate plating 51 may be approximately uniform in view of the variation naturally caused on the thickness of the normal substrate plating. The substrate plating 51, however, may be grasped to have a strictly uniform thickness because it is the region integrated with the padding plating 53 with absence of a boundary.

The padding plating 53 has the thickness T2 that is greater than the thickness T1 of the terminal body 39. According to the embodiment, T1 and T2 are set as "T1=8.9 μm<T2=14.1 μm." The padding plating 53, however, may be thinner than the terminal body 39 in thickness as long as the padding plating 53 entirely covers the terminal body 39 and swells upward from the insulating layer 33 in cross section. The widths W1 and W2 of the padding plating 53 including the substrate plating 51 on both sides of the terminal body 39 are equivalent to each other. According to the embodiment, W1 is set to about 16.3 μm and W2 is set to about 16.0 μm. In addition, though the widths W1 and W2 of the padding plating 53 slightly vary according to the plating process, the variation on the widths W1 and W2 is very subtle in comparison with the entire width of terminal 37.

The padding plating 53 has the arch-shaped surface in cross section according to the aforementioned semi-cylindrical shape. The top region of the surface of the padding plating 53 has the curvature that is smaller than the curvature of the corner region on each side of the top region so that the melted solder is stably held on the terminal 37 at the time of the reflow soldering. According to the embodiment, the top region of the surface having the smaller curvature has the width corresponding to the width of the terminal body 39. In addition, the top region of the surface may be formed into a flat.

The surface plating 55 is a thin gold (Au) plating and covers the entire surface of the padding plating 53 so that the surface plating 55 is shaped into a semi-cylindrical with an arch sectional shape according to the padding plating 53. In addition, the surface plating 55 may entirely cover the wiring pattern 35. To the normal substrate platings of the other terminals without a padding plating 53, the surface plating similar to the surface plating 55 is formed on the surface of each one normal substrate plating.

The comparative examples illustrated in FIGS. 5B and 5C have the substrate platings 51A and 51B on which the surface platings are formed without padding platings, respectively. The substrate platings 51A and 51B extend along the respective terminal bodies 39A and 39B with the uniform thickness. The terminal 37 of FIG. 5A according to the embodiment, therefore, largely swells due to the level raising by comparison with the terminals 37A and 37B of FIGS. 5B and 5C. Incidentally, the terminal bodies 39A and 39B of the terminals 37A and 37B themselves are widened or expanded relative to the respective wiring traces 41 in the planar view.

From the surface of the terminal 37 to the surface of the terminal 43 of the slider 27, the fillet 47 spans as illustrated in FIG. 2 as mentioned above. The fillet 47 will be explained in comparison with fillets illustrated in FIGS. 6A to 7B according to comparative examples.

Figure 6A:
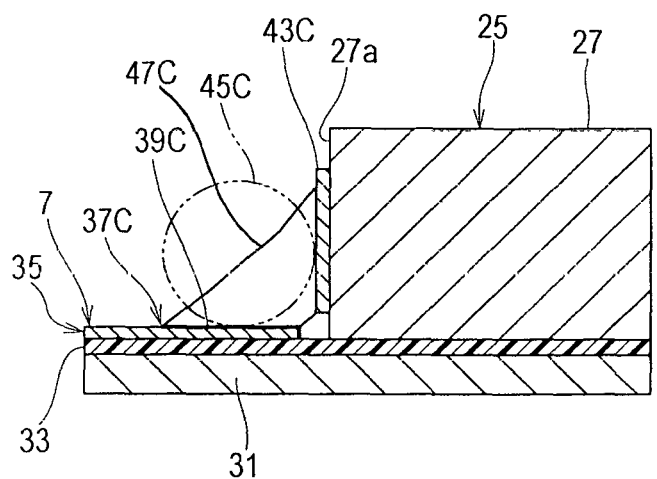
FIG. 6A is a sectional view schematically illustrating a connection between terminals at a head portion of a flexure without a padding plating according to a comparative example.
Figure 6B:
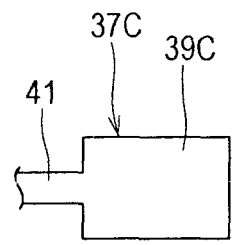
FIG. 6B is a plan view illustrating the terminal of FIG. 6A.
Figure 7A:
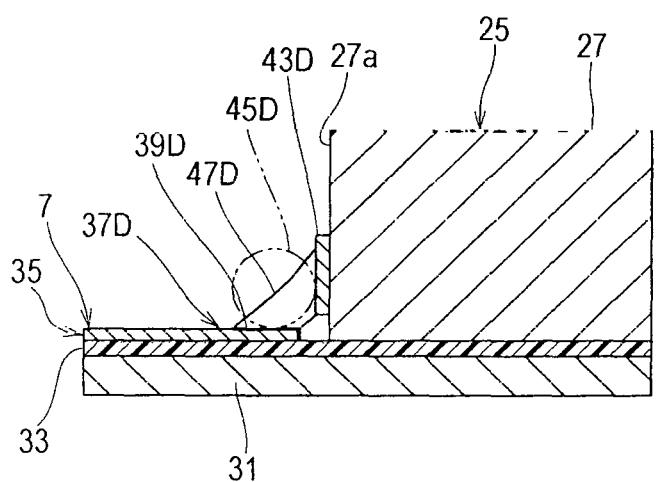
FIG. 7A is a sectional view schematically illustrating a connection between terminals at a head portion of a flexure without a padding plating according to another comparative example.
Figure 7B:
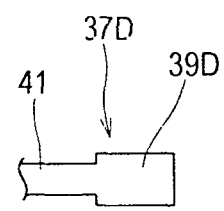
FIG. 7B is a plan view illustrating the terminal of FIG. 7A.

FIG. 6A is a sectional view schematically illustrating a connection between terminals 37C and 43C at a head portion of a flexure 7 without a padding plating according to a comparative example. FIG. 6B is a plan view illustrating the terminal 37C of FIG. 6A. FIG. 7A is a sectional view schematically illustrating a connection between terminals 37D and 43D at a head portion of a flexure 7 without a padding plating according to another comparative example. FIG. 7B is a plan view illustrating the terminal 37D of FIG. 7A.

In FIGS. 6A and 6B, the four terminals 37C and the four terminals 43C are formed only for read/write elements and are relatively large, for example. Accordingly, relatively-large solder balls 45C are used to form fillets 47C having sufficient thickness.

If the number of terminals and terminals increase to eight to ten, each terminal 37D and each terminal 43D have to be relatively small and require a relatively-small solder ball 45D as illustrated in FIGS. 7A and 7B. This configuration results in an insufficient thin fillet 47D that is not a clear fillet having the sufficient thickness, which increases risk for connection failure.

In contrast, as illustrated in FIG. 2 according to the embodiment, the padding plating 53 raises the level of the terminal 37 to put the surface of the terminal 37 close to the terminal 43. With this, the clear fillet 47 is formed between the terminals 37 and 43 and is sufficient to prevent connection failure even if the number of the terminals 37 and 43 increases to eight to ten to reduce the size of the terminals 37 and 43 and the solder ball 45.

Figure 8:
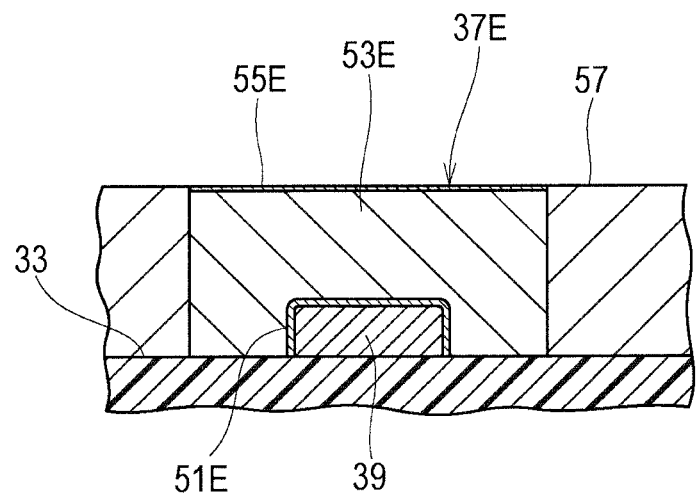
FIG. 8 is a sectional view schematically illustrating a formation of a padding plating with the use of a mask according to the first embodiment.

FIG. 8 is a sectional view schematically illustrating a formation of a padding plating 53E with the use of a mask 57 according to the first embodiment.

As illustrated in FIG. 8, the padding plating 53E of a terminal 37E may be formed by a plating process with the partial mask 57 around the terminal 37E. In this case, the padding plating 53E entirely coats the top face and the side faces of a terminal body 39 and entirely swells from an insulating layer 33. On the surface of the padding plating 53E, a surface plating 55E is formed.

In the case of using the mask 57, the side faces of the terminal body 39 may have the substrate platings 51E only and the top face of the terminal body 39 may have the padding plating 53E together with the substrate plating 51E. In this case, the terminal body 39 is preferably widened or expanded in the planar view relative to the wiring trace 41 because the terminal 37 is not expanded in the planar view by forming the padding plating 53E.

As explained above, the terminal 37 (37E) as the terminal pad according to the embodiment has terminal body 39, the substrate plating 51 formed on the surface of the terminal body 39 and having the uniform thickness, the padding plating 53 made of the same material as the substrate plating 51 and integrated with the substrate plating 51 so that the padding plating 53 swells with respect to the substrate plating 51 and the surrounding part of the insulating layer 33, and the surface plating 55 formed on the surface of the padding plating 53.

With this configuration, the padding plating 53 raises the level of the terminal 37 of the flexure 7 to reduce the distance between the surfaces of the terminal 37 and the terminal 43 of the slider 27 or head 25.

The embodiment, therefore, forms the sufficient fillet 47 to prevent a connection failure when the solder turns a liquid to a solid to connect the terminal 37 to the terminal 43 even if the smaller solder ball 45 is used (if the used amount of the bonding material decreases).

Since the padding plating 53 is made of the same material as the substrate plating 51 and integrated with the same, the padding plating 53 is easily formed.

Further, the padding plating 53 is expanded or widened relative to the wiring trace 41 in the planar view to form the terminal 37 having the required planar shape. This configuration, therefore, allows the end part of the wiring trace 41 itself to be used as the terminal body 39 to easily form the terminal 37.

The terminal body 39 of the terminal 37 is located on the insulating layer 33 of the flexure 7 at the head portion, the padding plating 53 encloses the surface of the terminal body 39 through the substrate plating 51 in cross section. This configuration surely raises the level of the terminal 37 and the expands relative to the wiring trace 41 in the planar view.

The padding plating 53 has the thickness being greater than the thickness of the terminal body 39, thereby to surely and sufficiently reduce the distance between the terminals 37 and 43 and allow the sufficient fillet 47 to be surely formed to prevent a connection failure.

Since the substrate plating 51 and the padding plating 53 are the nickel plating, the padding plating 53 is easily formed by the process similar to the normal substrate plating process.

In particular, the padding plating 53 is formed by the plating process without a mask according to the controlled processing time or by the plating process with the partial mask 57 for the terminal 37E. The padding plating 53, therefore, is easily and surely formed by the extension or continuation of the normal substrate plating process.

Further, in the case where the padding plating 53 is formed without a mask, the padding plating 53 including the substrate plating 53 involves the uniform widths W1 and W2 on both sides of the terminal body 39. This configuration improves accuracy of the position and the shape of the terminal 37 of the flexure 7 and therefore positioning accuracy of the terminal 43 of the slider 27 relative to the terminal 37.

Figure 10:
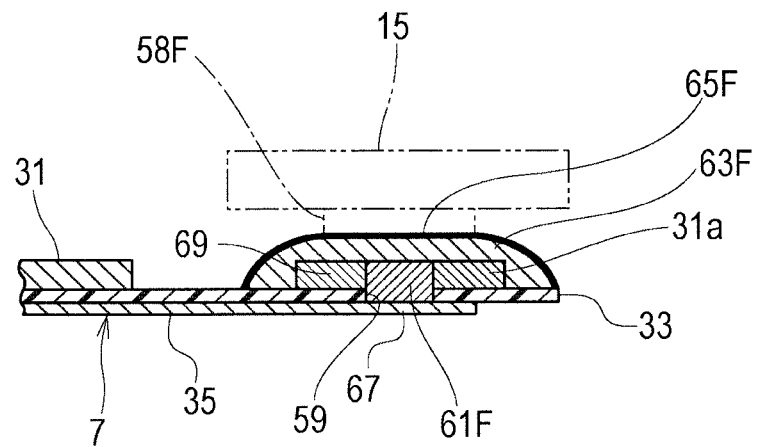
FIG. 10 is a sectional view schematically illustrating another connection between a terminal of a flexure and a piezoelectric element of a positioning actuator according to the second embodiment of the present invention.

FIGS. 9 and 10 are sectional views schematically illustrating different examples of a connection between a terminal of a flexure and a piezoelectric element of a positioning actuator according to the second embodiment of the present invention. In FIGS. 9 and 10, a flexure is positioned on the downside.

According to the embodiment, a padding plating 63 or 63F is applied to a terminal 29 for a positioning actuator 9 of a head suspension 1 at an intermediate portion between a head portion and a tail portion of a flexure 7. The head suspension 1 of this embodiment has the same structure as the first embodiment excepting the terminal 29.

As illustrated in FIGS. 1 and 9, the flexure 7 of the head suspension 1 has the terminal 29 as the terminal pad according to the embodiment. To the terminal 29, the piezoelectric element 15 as the functional part is connected with the conductive paste 58 such as silver paste that is the bonding material.

The terminal 29 includes a terminal body 67, a via plating 61 serving as a base plating, the padding plating 63, and a surface plating 65.

The terminal body 67 is a part of the wiring pattern 35. The wiring pattern 35 is arranged or positioned on the first side of the insulating layer 33 of the flexure 7. The insulating layer 33 has a through hole 59 extending from the first side to the second side of the insulating layer 33. The part of the wiring pattern 35 as the terminal body 67 is positioned so as to close the through hole 59 on the first side of the insulating layer 33. With this configuration, the terminal body 67 is arranged opposite through the insulating layer 33 to the piezoelectric element 15 and faces the through-hole 59 formed through the insulating layer 33. In addition, on the second side of the insulating layer 33, a part of the conductive thin plate 31 surrounding the through hole 59 is removed by, for example, etching.

The via plating 61 is a nickel plating in the through hole 59 of the insulating layer 33. The via plating 61 is formed on the surface of the terminal body 67 with the uniform thickness and fills the through hole 59 so as to have the surface flashing with the surface on the second side of the insulating layer 33. In this way, the via plating 61 is formed on the surface of the terminal body 67 and located in the through-hole 59 so that the surface of the via plating 61 opposes to the piezoelectric element 15 through the padding plating 63 and the surface plating 65. Incidentally, the thickness of the via plating 61 is approximately uniform like the substrate plating 51 of the first embodiment, but it may be strictly uniform.

The padding plating 63 is integrated with the via plating 61 and is made of nickel that is the same material as the via plating 61 so that the padding plating 63 swells toward the piezoelectric element 15 with respect to the via plating 61 and the surrounding part of the insulating layer 33 in cross section. The padding plating 63 has the circular planar shape overlapping the through hole 59 and the surrounding area thereof. The diameter of the padding plating 63 is about twice as much as the diameter of the through hole 59, but is not limited thereto.

The formation of the padding plating 63 is carried out as well as the via plating 61 by a plating process without a mask according to controlled processing time. Namely, the via plating 61 and padding plating 63 are continuous and integrated with each other with absence of a boundary though they are conceptually divided in FIG. 9.

In particular, the formation process of the padding plating 63 extends for the terminal 29 the processing time of the normal via plating process without the padding plating 63. The extension of the processing time is carried out before or after the formation of the normal via plating. With this method, the via plating 61 and the padding plating 63 is integrated with each other on the surface of the terminal body 67.

The via plating 61 means a partial region of the integrated via plating 61 and padding plating 63 that coats the surface of the terminal body 67 with the uniform thickness and corresponds to the normal via plating without the padding plating 63.

Namely, the padding plating 63 and the via plating 61 are grasped as illustrated in FIG. 9 regardless of timing of the extension of the processing time of the normal via plating process before or after the formation of the normal via plating.

The padding plating 63 has the thickness greater than the thickness of the terminal body 67 and the via plating 61. The padding plating 63, however, may be thinner than the terminal body 67 and the via plating 61 as long as it entirely swells toward the piezoelectric element 15 with respect to the insulating layer 33 in cross section.

The padding plating 63 has the arch-shaped surface in cross section. The top region of the surface of the padding plating 63 has the curvature that is smaller than the curvature of the corner on each side of the top region so that the conductive paste is stably held on the terminal 29. The top region of the surface having the smaller curvature has the diameter corresponding to the diameter of the through hole 59. In addition, the top region of the surface may be formed into a flat.

The surface plating 65 is a thin gold plating and covers the entire surface of the padding plating 63 so that the surface plating 65 has the circular planar shape with an arch sectional shape according to the padding plating 63.

Accordingly, the surface plating 65 largely swells toward the piezoelectric element 15 with respect to the surface of the insulating layer 33 according to the level raising due to the padding plating 63.

With this level raising, the surface plating 65 is put close to the piezoelectric element 15 so that the minimum distance between the surface plating 65 and the piezoelectric element 15 is shorter than that between the via plating 61 and the piezoelectric element 15. This configuration allows the terminal 29 and the piezoelectric element 15 to be connected to each other with the less used amount of the conductive paste 58 while preventing a connection failure.

The padding plating 63 may be formed using a mask like FIG. 8 of the first embodiment.

The example of FIG. 10 has a reinforcing part 31a with a ring shape surrounding the through hole 59 on the second side of the insulating layer 33. The reinforcing part 31a is formed by leaving a part of the conductive thin plate 31 of the flexure 7 at the time of etching or the like. The reinforcing part 31a has a through hole 69 that is concentrically aligned with the through hole 59 of the insulating layer 33.

The via plating 61F fills the through hole 59 and 69 and the padding plating 63F integrated with the via plating 61F entirely swells toward the piezoelectric element 15 with respect to the insulating layer 33 in cross section and spreads into the surrounding area of the reinforcing part 31a. The padding plating 63F has the approximately-arch-shaped surface in cross section. The top region of the surface of the padding plating 63F is flat and the diameter of the flat region is equal to or slightly greater than the diameter of the through holes 59 and 69. In addition, the top region of the surface of the padding plating 63F may be formed into a curved shape with a gentle curvature relative to each corner.

The surface plating 65F further swells toward the piezoelectric element 15 with respect to the surface of the insulating layer 33 according to the level raising due to the padding plating 63F.

With this level raising, the surface plating 65F is put close to the piezoelectric element 15 like the example of FIG. 9, thereby to allow the terminal 29 and the piezoelectric element 15 to be connected to each other with the less used amount of the conductive paste 58 while preventing a connection failure.

Figure 11:
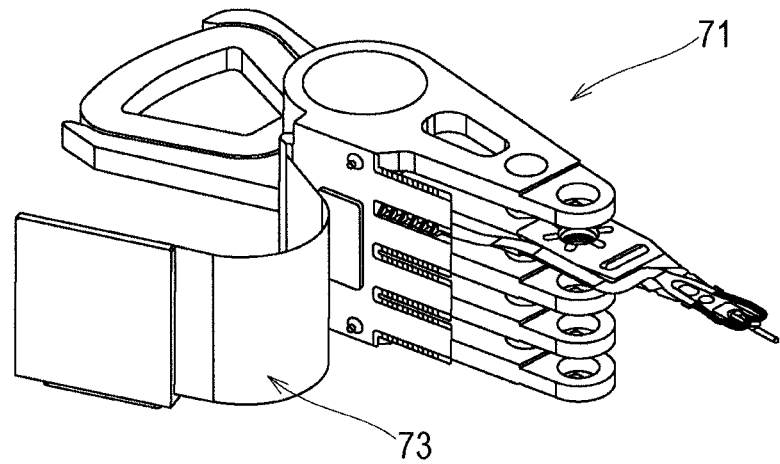
FIG. 11 is a perspective view illustrating a head stack assembly according to a third embodiment of the present invention.
Figure 12:
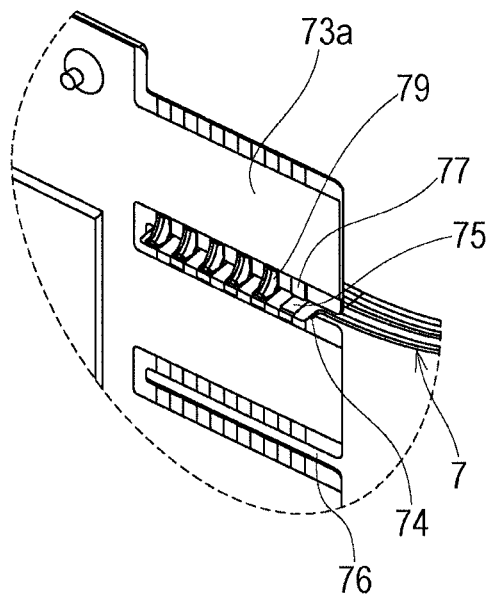
FIG. 12 is a perspective view partly illustrating a connection between terminals at a tail portion of a flexure of FIG. 11.
Figure 13:
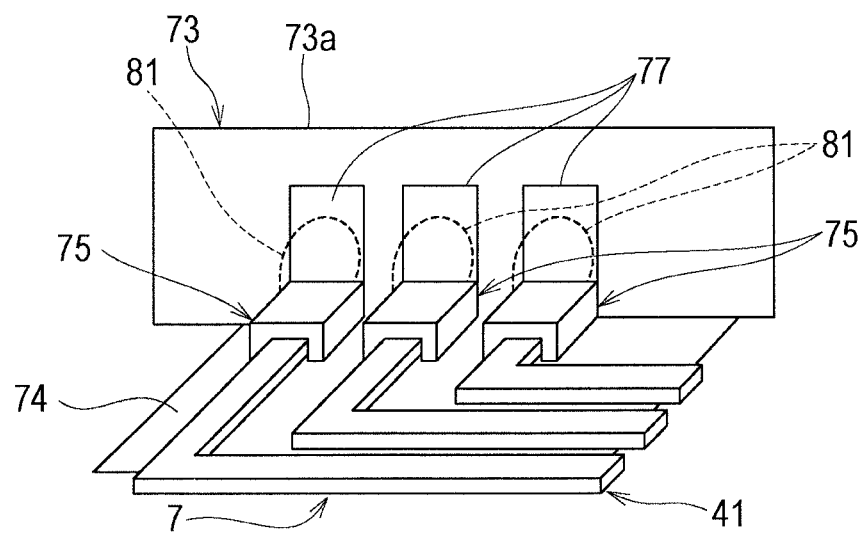
FIG. 13 is a perspective view schematically illustrating the connection at the tail portion of the flexure of FIG. 12.

FIG. 11 is a perspective view illustrating a head stack assembly 71 according to the third embodiment of the present invention. FIG. 12 is a perspective view partly illustrating a connection between terminals 75 and 77 at a tail portion 74 of the flexure 7 of FIG. 11. FIG. 13 is a perspective view schematically illustrating the connection at the tail portion 74 of the flexure 7 of FIG. 12.

According to the embodiment, a padding plating is applied to each one terminal 75 on the tail portion 74 of the head suspension 1 of the head stack assembly 71.

As illustrated in FIGS. 11 and 12, the head stack assembly 71 supports a plurality of head suspensions 1 to which a main flexible circuit board 73 is connected. In FIGS. 11 and 12, only the single head suspension 1 is represented for convenience of explanation.

The main flexible circuit board 73 has slits 76 at an edge portion 73a. On both sides of each one slit 76, a plurality of terminals 77 are arranged. The tail portion 74 of each one head suspension 1 partly passes through the corresponding slit 76 to protrude from the front face of the main flexible circuit board 73. On the protruding part of the tail portion 74, terminals 75 are located. The terminals 75 are connected to the respective terminals 77 of the edge portion 73a by reflow soldering with the use of solder balls to form fillets 79.

Each terminal 75 of the tail portion 74 employs the same structure as the terminal 37 of the first embodiment. In particular, the terminal 75 includes the terminal body 39, the substrate plating 51 covering as the base plating the surface of the terminal body 39 in the form of the film, the padding plating 53 made of nickel that is the same material as the substrate plating 51 and integrated with the substrate plating 51 so that the padding plating 53 swells with respect to the substrate plating 51 and the surrounding portion of the insulating layer 33 in cross section, and the surface plating 55 formed on the surface of the padding plating 53 (FIG. 5).

The substrate plating 51 and the padding plating 55 of the terminal 75 are formed using the mask 57. Accordingly, the sectional shape of the padding plating 53 according to the embodiment is rectangular as illustrated in FIG. 13. The substrate plating 51 and the padding plating 55, however, may be formed by controlling the processing time of the plating process without a mask.

As illustrated in FIG. 13, each terminal 75 of the tail portion 74 is arranged orthogonal to the corresponding terminal 77 of the edge portion 73a of the main flexible circuit board 73. The terminals 75 and 77 are connected to each other by reflowing a solder ball 81 arranged therebetween.

In FIG. 13, the main flexible circuit board 73 has no slit 76 of FIGS. 11 and 12 and the tail portion 74 is entirely arranged on the front face side of the edge portion 73a for convenience of explanation. With reference to also FIGS. 11 and 12, each tail portion 74 passes through the corresponding slit 76 to arrange the terminals 75 orthogonal to the respective terminals 77 like FIG. 13. In this state, the terminals 75 and 77 are connected together like FIG. 13 to form the fillets 79 like FIGS. 11 and 12. According to this embodiment, the structure of FIG. 13 may be employed instead of the structure of FIGS. 11 and 12.

According to the embodiment, the surface of each terminal 75 largely swells toward and comes close to the surface of the surface of the terminal 77 of the main flexible circuit board 73 with the level raising due to the padding plating. This configuration is capable of forming with the smaller solder ball 81 the clear fillet 79 sufficient to prevent a connection failure.

What is claimed is:

1. A terminal pad of a flexure for a head suspension connected to a functional part through a bonding material, comprising:
   a terminal body;
   a base plating formed on a surface of the terminal body and having a uniform thickness;
   a padding plating bulging from the base plating and made of a same material as the base plating and being continuous with and integrated with the base plating without a boundary between the base plating and the padding plating; and
   a surface plating of a material different from the material of which the padding plating is made, formed on a surface of the padding plating and defining a boundary between the surface plating and the padding plating;
   wherein the flexure has an insulating layer and the padding plating has a D-shaped cross-section that bulges from the base plating and the insulating layer around the base plating to define an arc-shaped surface including corner regions rising from the insulating layer, and a top region spanning between the corner regions wherein the top region has a curvature smaller than the curvature of the corner regions or the top region has a flat profile.

2. The terminal pad of claim 1, wherein the functional part is a slider arranged on a head portion of the flexure or a main flexible circuit board arranged on a tail portion of the flexure, the terminal body is located on the insulating layer of the flexure at the head portion or the tail portion, the base plating is a substrate plating that coats the surface of the terminal body in a form of a film, and the padding plating encloses the surface of the terminal body through the substrate plating in cross section.

3. The terminal pad of claim 1, wherein the padding plating has a thickness being greater than a thickness of the terminal body.

4. The terminal pad of claim 1, wherein the functional part is a piezoelectric element of a positioning actuator of the head suspension, the terminal body is arranged opposite through the insulating layer of the flexure to the piezoelectric element and faces a through-hole formed through the insulating layer at an intermediate portion between a head portion and a tail portion of the flexure, the base plating is a via plating coating the surface of the terminal body and located in the through-hole, and the padding plating bulges toward the piezoelectric element from the via plating in cross section.

5. The terminal pad of claim 1, wherein the base plating and the padding plating are a nickel plating.

6. A method of forming the terminal pad of claim 1, comprising:
   forming the padding plating by a plating process without a mask according to controlled processing time or by a plating process with a partial mask for the terminal pad.

7. The terminal pad of claim 1, wherein the insulating layer extends along an entire length of the padding plating.

8. The terminal pad of claim 1, wherein the top region of the padding plating has a flat profile.

9. The terminal pad of claim 1, wherein the curvature of the corner regions define convex shapes which face away from the padding plating.

10. The terminal pad of claim 1, wherein the top region is curved and defines a convex shape which faces away from the padding plating.

11. The terminal pad of claim 1, wherein the padding plating defines a first continuous convex shape which faces away from the insulating layer and which extends from a first part of the insulating layer to a second part of the insulating layer or wherein the padding plating defines a second continuous shape which extends from the first part of the insulating layer to the second part of the insulating layer and wherein the second continuous shape consists of the flat top portion and the two corner portions which are convex in shape.

* * * * *